Sept. 2, 1924.  
V. W. PAGE  
1,507,556  
LATCH FOR SEAT AND BODY CONSTRUCTIONS FOR MOTOR VEHICLES  
Filed Nov. 22, 1921

WITNESSES

INVENTOR  
VICTOR W PAGE  
BY  
ATTORNEYS

Patented Sept. 2, 1924.

1,507,556

UNITED STATES PATENT OFFICE.

VICTOR W. PAGÉ, OF NEW YORK, N. Y.

LATCH FOR SEAT AND BODY CONSTRUCTIONS FOR MOTOR VEHICLES.

Application filed November 22, 1921. Serial No. 517,037.

*To all whom it may concern:*

Be it known that I, VICTOR W. PAGÉ, a citizen of the United States, and a resident of the city of New York, Kew Gardens, borough of Queens, in the county of Queens and State of New York, have invented new and Improved Latches for Seat and Body Constructions for Motor Vehicles, of which the following is a full, clear, and exact description.

The present invention relates to new and useful improvements in seat and body construction for motor vehicles and it pertains more particularly to the seat and body construction shown and described in my pending application Serial No. 451,110, filed March 10, 1921.

It is one of the primary objects of my invention to provide a new and improved locking means for seats of the tilting type.

It is a further object of the invention to provide a single locking means which serves to retain the seat in both its operative and its inoperative position.

It is a further object of the invention to provide a locking means which is carried by the seat and adapted to engage the body at the ends of said seat to secure the seat in both its operative and its inoperative position.

With the above and other objects in view, reference is had to the accompanying drawings, in which—

Figure 1:
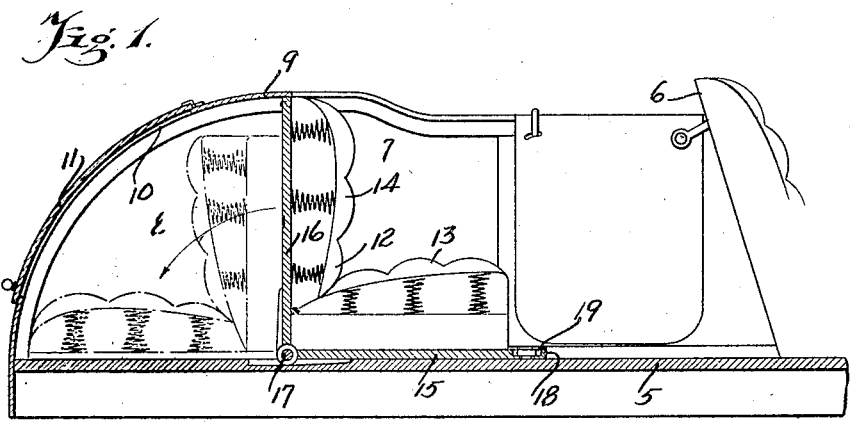
Figure 1 is a longitudinal sectional view of the tonneau of a vehicle body, showing the seat in full lines in operative position and in dotted lines in inoperative position.

Referring more specifically to the drawings, the reference character 5 designates the floor of the body of a vehicle, 6 the forward seats, and 7 the tonneau. The rear end of the tonneau is so constructed as to provide a compartment 8 closed by a top wall 9, access to said compartment 8 being had through an opening 10 closed by a door 11 of any suitable type. The reference character 12 designates the rear seat, and said seat comprises a seat portion 13 and a back portion 14. The seat portion 13 is built up upon a seat member 15, and the back portion 14 is built up upon a back member 16. These members 15 and 16 are secured together to form a substantially right-angular structure. By this construction it is apparent that the seat is in the form of a single unit, and said seat is mounted within the vehicle body by a suitable pivotal mounting 17, about which said seat as a unit is adapted to rock from its operative position to its inoperative position, and vice versa.

Figure 2:
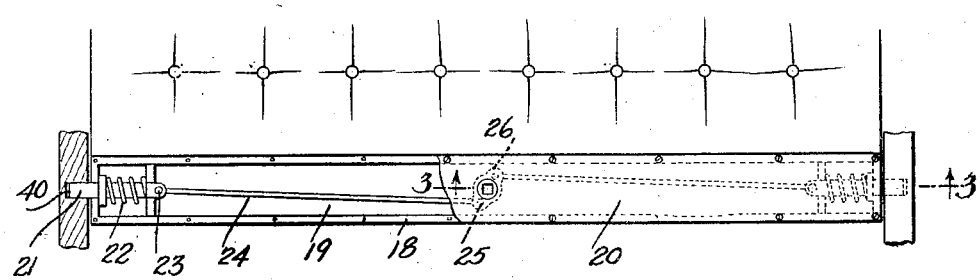
Fig. 2 is a detail plan view partly broken away of the seat locking mechanism when the seat is in its operative position.
Figure 3:
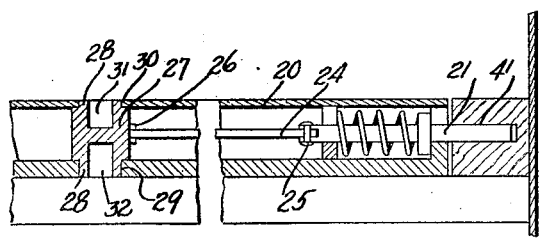
Fig. 3 is a detail sectional view of the locking mechanism shown in the position in which it secures the seat in its inoperative position.

The seat member 15 is projected beyond the seat as designated by the reference character 18, and as more clearly shown in Fig. 2, this projecting portion is cut out as indicated by the reference character 19, to form a housing. The reference character 20 designates a top plate adapted to close the housing. Mounted in each end of the extension member 18 is a sliding bolt 21, and each of said sliding bolts 21 is adapted to be normally pressed inwardly of the housing 19 by means of a coil spring 22. Pivotally connected to the inner end of each of the sliding bolts 21, as at 23, is a rod 24, and these rods 24 are connected as at 25, to a rocking plate 26. These rocking plates 26 are carried by a tubular member 27, the ends of which are reduced as at 28, the lower end of said tubular member 27 being received in a cut-out portion 29 in the body portion of the housing, the upper reduced end 28 being received in an opening 30 in the closed plate 20. This tubular member 27 is provided with squared recesses 31 and 32 adapted to receive a key or other suitable operating instrument by which the tubular member may be rotated.

The device functions in the following manner:

With the several parts in the position shown in Fig. 1, when it is desired to move the seat to the dotted line position shown in said figure, a key is inserted in the squared recess 31 and the tubular member 28 is rocked to withdraw the sliding bolts 21 from the recesses 40 in the body of the vehicle to permit of movement of the seat. As the seat is moved to the dotted line position, the sliding bolts 21 will engage recesses 41 in the upper portion of the body to retain the seat in its inoperative position. When, however, it is desired to return the seat to its operative position, the key is inserted in the squared recess 32, and the tubular member 27 is again operated to withdraw the sliding bolts from their recesses 41 to permit of the seat moving to the full-line position shown in Fig. 1.

From the foregoing it is apparent that the present invention provides a single locking means adapted to secure a pivoted or rocking seat in its operative or inoperative position, and that the mechanism of said locking means is readily accessible and is of simple construction.

I claim:

A lock of the type set forth comprising a housing, a transverse partition adjacent each end of the housing and forming a second housing, bolts slidably mounted in said partitions and the end of the first-mentioned housing, a spring surrounding each of said bolts and adapted to maintain the bolts in extended position, a link connected to each of said bolts and extending substantially to the center of said first-mentioned housing, a lever mounted in said housing and to which each of said links is pivotally connected, and a recess formed in the lever and adapted to receive an operating means to operate the lever and simultaneously operate the bolts.

VICTOR W. PAGÉ.